Figure 1:
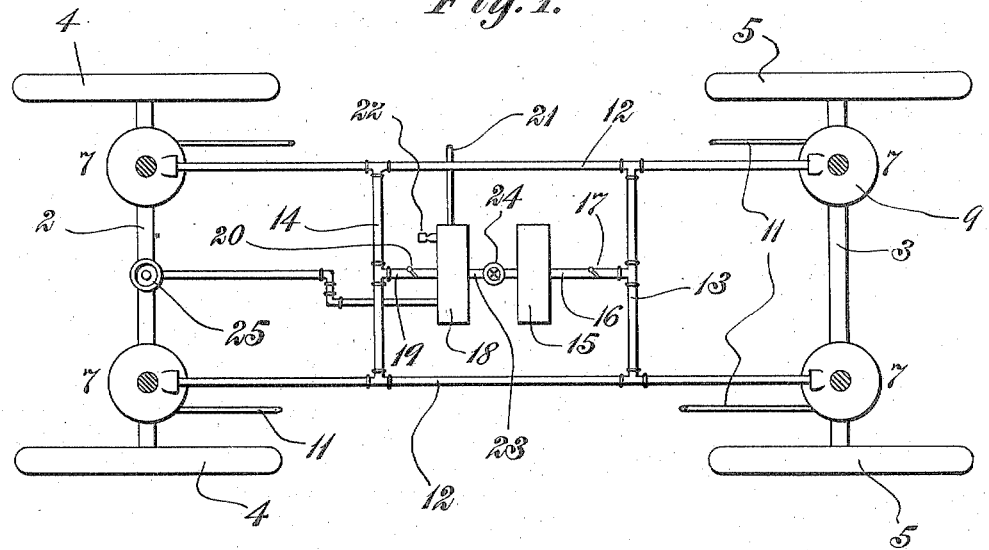

G. VON SCHANTZ.
PNEUMATIC SUPPORTING MEANS.
APPLICATION FILED MAR. 24, 1910.

966,864.

Patented Aug. 9, 1910.

Witnesses:
L. L. Markel.
R. Anderson

Inventor:
G. von Schantz
By his Attorneys,
Sutherland & Anderson

UNITED STATES PATENT OFFICE.

GUSTAF VON SCHANTZ, OF NEW BRITAIN, CONNECTICUT.

PNEUMATIC SUPPORTING MEANS.

966,864.  Specification of Letters Patent.  Patented Aug. 9, 1910.

Application filed March 24, 1910. Serial No. 551,273.

*To all whom it may concern:*

Be it known that I, GUSTAF VON SCHANTZ, a subject of the King of Sweden, residing at New Britain, in the county of Hartford and State of Connecticut, have invented certain new and useful Improvements in Pneumatic Supporting Means, of which the following is a specification.

This invention relates to pneumatic supporting means.

Pneumatic supporting means involving my invention, comprises a pneumatic support having two relatively movable members and means for maintaining a substantially uniform pressure in said support, and it is one of the primary purposes of my invention to relieve unduly excessive pressure that may be developed in said support on the relative movement of the members thereof by virtue of which said excessive pressure cannot react on the support as in such an event the reaction would cause a sudden movement or rebound of the movable member of the support. This "pneumatic support" as I have termed it may take various forms, and I will hereinafter describe one of said forms.

The apparatus can be used with advantage in many different connections; for example, in conjunction with or as part of an automobile or other vehicle, and in such a use I prefer to employ several of the said pneumatic supports and they are preferably in communication with each other so as to equalize shocks; that is to say if a shock of average character is received directly or practically so by one of the supports it is through a system of piping connecting the same with the companion supports transferred to the latter. In other words, the said shock is distributed and is not localized.

In the drawings accompanying and forming part of the present specification, I have represented in detail one form of embodiment of the invention which to enable those skilled in the art to practice the invention will be set forth fully in the following description while the novelty of the invention will be included in the claims succeeding said description. From the observation just made it will be evident that I do not restrict myself to the showing made by said drawings and description; I may depart radically therefrom within the scope of my invention as expressed in said claims.

In the organization illustrated the supporting means is interposed between the running gear and body of the vehicle and comprises a plurality, such as four, of the said pneumatic supports, a primary tank being utilized to maintain a substantially uniform pressure in the system made up of the said supports and the connected piping or tubing therefor. Under ordinary conditions the supporting means will absorb any shocks. Should the vehicle strike an unusual obstruction or depression this will cause an instant operation of one or more of the supports and in such case the air in the system will be highly compressed. When this pressure is unduly excessive, I automatically relieve the same and while this result can be obtained in several ways, I prefer to discharge it into a high pressure tank. The primary or low pressure tank presents a suitable means for maintaining a substantially uniform pressure in the several supports and this pressure may be for example, sixty pounds which would be sufficient for use in an ordinary automobile capable of carrying several passengers. The high pressure tank contains air, for illustration, under eighty pounds pressure or in this neighborhood. When an excessive pressure is developed in the manner indicated if it be above that in the high pressure tank, the highly compressed air is discharged into this tank. I provide suitable relief and check valves to assure proper working conditions. There may be cases where I can dispense with the high pressure tank and there may be vehicles where it might be necessary to employ only one or possibly two pneumatic supports in connection with means for relieving the excessive pressure when the condition to which I have alluded, ensues.

Comparing the action of my pneumatic supporting means with ordinary springs, it is evident that the very objectionable reaction of a suddenly compressed spring is entirely eliminated and that instead the body of the vehicle is brought to its normal position by a gradual lifting action. The energy of the shock is absorbed and arrested in the high pressure tank and dissipated by radiation and reduction of pressure through the reducing valve which operate in connection with the low pressure tank. Shock absorbers as now generally designed simply resist shock by the spring or springs and do not actually absorb the shock. By my device the shock may be checked to a greater or less extent by adjusting the reducing valve, and the energy that with springs reacts on the body, is immediately absorbed, arrested and gradually dissipated.

Figure 2:
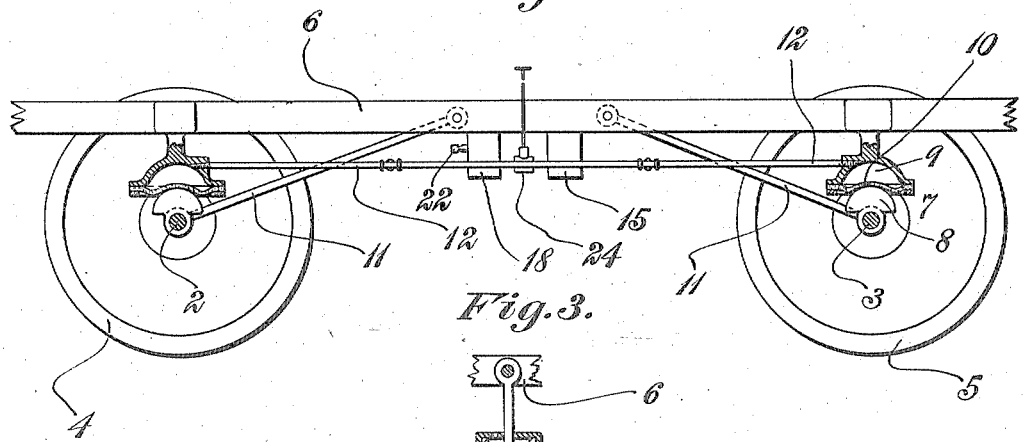
Figure 3:
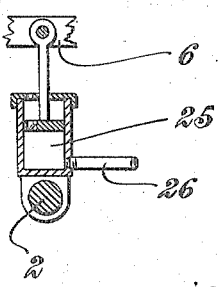

Referring to said drawings: Figure 1 is a top plan view of pneumatic supporting means involving my invention and showing the same in connection with the running gear of an automobile, the body of which is removed. Fig. 2 is a side elevation of the car, with parts in section, and, Fig. 3 is a sectional view of a pressure-maintaining pump.

Like characters refer to like parts throughout the several figures.

As already intimated the supporting means is of particular utility when utilized in connection with a vehicle such as an automobile, the running gear and body of which are partially shown in Fig. 2, the pneumatic supporting means being disposed between said running gear and body. The running gear includes in its makeup the front and rear axles 2 and 3 provided with the usual wheels 4 and 5, the body being designated by 6. In the present case there are four pneumatic supports and they are preferably disposed near the corners of the body 6 and below said body, being sustained by the axles 2 and 3. As will be gathered from the statements already made, I do not restrict myself to the use of any particular form of pneumatic supports, although the ones illustrated are quite satisfactory. There are four of said supports and each is denoted in a general way by 7 and a detailed description of one will suffice for the remainder and in this connection reference may be had to the support 7 shown at the right in Fig. 2 and carried by the rear axle 3. The support 7 involves in its construction a lower member 8 and an upper member 9, the latter being shown as of cup form so as to present an interior air receiving chamber, a diaphragm 10 of rubber, composite or other suitable material, being located between the two members 8 and 9 and closing the chamber against the escape of the compressed air. The diaphragm 10 rests on the convex upper surface of the lower member 8, which member 8 in the present instance is rigidly connected with the axle 3. It will be evident that on the relative movement of the body 6 toward the axles 2 and 3, the air within the pneumatic supports 7 is compressed, and as will be obvious, it is my intention to prevent the reaction of the compressed air on the members 9 when such air is highly compressed or when it is compressed to a point above the pressure of the air in the secondary or high pressure tank to which I have already briefly referred.

I have shown as rigidly connected with the several lower members 8, rods 11 which extend toward the intermediate portion of the body 6 and are pivoted to said body, these rods presenting a convenient means for holding the body to the running gear and for also insuring the vertical alinement of the respective superposed members of the four pneumatic supports.

The rear supports are connected or in communication with the front supports by pipes or tubes 12, which as will be evident, extend longitudinally of the vehicle. These pipes 12 are connected by transverse pipes 13 and 14 by reason of which the several supports are put into direct and uninterrupted communication. On the up and down relative motion of the body and running gear the air travels from one support to another back and forth with rapidity through the several connecting pipes. I have already explained how when the shock is received by one support it is transmitted to the other supports, so as to equalize the shock or distribute the same over the system, which I consider to be made up of the several supports and their connecting tubes.

A primary or low pressure tank is shown at 15, being connected by a pipe 16 with the transverse pipe 13, said pipe 16 inclosing an outwardly opening check valve 17. This valve is opened outwardly at approximately sixty pounds pressure, and as there is maintained a constant pressure of sixty pounds in the primary or low pressure tank 15, it will be clear that under normal conditions the valve 17 is open. It will be assumed that there is a sudden increase of pressure in the system and in such an event as this, the compressed air becomes operative for shutting the valve 17 and thereby preventing the highly compressed air from entering the tank 15. Said valve 17 therefore closes toward the tank 15.

In addition to the tank 15 there is a second tank 18 which communicates with the transverse pipe 14 by the pipe 19 inclosing an inwardly opening check valve 20 which opens when the pressure of air in the system becomes higher than that of said tank 18, which it has been assumed is eighty pounds. It will, therefore, be evident that the valve 20 closes away from the tank 18. The high pressure tank is initially supplied with compressed air by a suitable pump (not shown) which delivers the air into the said tank by way, for example, of a pipe 21. Under ordinary conditions the supporting means independently of the tank 18 will resist any average shocks and will do so in an effective manner. Should the vehicle be given an unusual shock the air in the system will be highly compressed and if the pressure is above that in the high pressure tank the excessively compressed air cannot enter the tank 15 but can enter the tank 18, opening for this purpose the check valve 20 and entering said tank 18. Under normal conditions the check valve 20 is held closed by the pressure of the air in the tank 18. Said tank 18 may be equipped with a blow-off or relief device 22, containing a valve which opens at a predetermined pressure to relieve the tank 18. This valve, of course, in practice will be set to open at a higher pressure than the normal one in said tank 18. Between the tanks 15 and 18 is a pipe 23 provided with a reducing or equalizing valve 24 which in the present instance opens at sixty pounds pressure but which like the usual valves of this type is adjustable to vary the amount. By reason of the fact that the normal pressure in the tank 18 is higher than that in the tank 15, I can owing to this equalizing valve, maintain a uniform pressure in the tank 15 and in the system. There may be cases, as will be apparent, where I could dispense with the tank 18 and relieve the excess pressure in some other manner. For instance, directly to atmosphere. The use of the tank 18, however, is highly advantageous as there is no waste of air. There may be also cases where I should prefer to provide the vehicle with a pump which is operated during the traveling motion of the vehicle and the air from which is supplied to the tank 18 to maintain the desired pressure therein and a pump such as that designated by 25, supported by the front axle 2 and operable by the body 6 as the same oscillates, serves satisfactorily in this connection, said pump being connected by a pipe 26 with the high pressure tank 18.

What I claim is:

1. An apparatus of the class described, comprising a pneumatic support having two relatively movable members, a low pressure tank in communication with said support, a check valve between said low pressure tank and support and closable toward said low pressure tank, a high pressure tank in communication with said support, and a check valve between said high pressure tank and support and closable away from said high pressure tank.

2. An apparatus of the class described, comprising a pneumatic support having two relatively movable members, a low pressure tank in communication with said pneumatic support, a check valve between said low pressure tank and pneumatic support and closable toward said low pressure tank, a high pressure tank in communication with said pneumatic support, a check valve between the high pressure tank and the pneumatic support and closable away from said high pressure tank, and a connection between the two tanks, provided with a reducing valve.

3. An apparatus of the class described comprising a plurality of pneumatic supports each having two relatively movable members, piping connecting said pneumatic supports, a low pressure tank connected with said piping, a check valve between the low pressure tank and the piping, closable toward said low pressure tank, a high pressure tank in communication with said piping, and a check valve between the high pressure tank and the piping, closable away from said high pressure tank.

4. An apparatus of the class described comprising a plurality of supports each having two relatively movable members, piping for putting said supports into communication, a low pressure tank connected with said piping, a check valve between the low pressure tank and the piping, closable toward said low pressure tank, a high pressure tank also in communication with said piping, a check valve between the high pressure tank and the piping, closable away from said high pressure tank, and a connection between the two tanks, provided with a reducing valve.

5. The combination with the running-gear and the body of an automobile, pneumatic supports on the running-gear for movably supporting the body and each having two relatively movable members, a low pressure tank, means provided with a check valve and closable toward said low pressure tank, for connecting said tank with said supports, a high pressure tank, means provided with a check valve closable away from said high pressure tank, for connecting said high pressure tank with said supports, and a connection between said tanks, provided with a reducing valve.

In testimony whereof I affix my signature in presence of two witnesses.

GUSTAF VON SCHANTZ.

Witnesses:
F. E. ANDERSON,
HEATH SUTHERLAND.